(12) United States Patent
Wang et al.

(10) Patent No.: US 10,547,166 B2
(45) Date of Patent: Jan. 28, 2020

(54) CABLE CHANNEL ADAPTER AND CABLE DISTRIBUTION SYSTEM

(71) Applicant: CommScope, Inc. of North Carolina, Hickory, NC (US)

(72) Inventors: Guangjun Wang, Jiangsu (CN); Elyse Y. Ge Hylander, Hickory, NC (US); Rodney A. Willis, Hickory, NC (US); Ernest Charles Pickens, Hickory, NC (US); Jing Wang, Jiangsu (CN)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 15/326,945

(22) PCT Filed: Jul. 14, 2014

(86) PCT No.: PCT/CN2014/082164
§ 371 (c)(1),
(2) Date: Jun. 9, 2017

(87) PCT Pub. No.: WO2016/008076
PCT Pub. Date: Jan. 21, 2016

(65) Prior Publication Data
US 2017/0271859 A1      Sep. 21, 2017

(51) Int. Cl.
*H02G 3/04* (2006.01)
*H02G 3/10* (2006.01)
*H02G 3/06* (2006.01)

(52) U.S. Cl.
CPC .......... *H02G 3/105* (2013.01); *H02G 3/0608* (2013.01); *H02G 3/0418* (2013.01); *H02G 3/0437* (2013.01)

(58) Field of Classification Search
CPC .......... H02G 3/08; H02G 3/081; H02G 3/105; H02G 3/10; H02G 3/22; H02G 3/06;
(Continued)

(56) References Cited

U.S. PATENT DOCUMENTS

| 5,486,650 A * | 1/1996 | Yetter | ...................... H02G 3/10 |
|---|---|---|---|
| | | | 174/53 |
| 5,923,753 A | 7/1999 | Haataja et al. | |

(Continued)

FOREIGN PATENT DOCUMENTS

| CN | 2335287 Y | 8/1999 |
|---|---|---|
| CN | 201204399 Y | 3/2009 |

(Continued)

OTHER PUBLICATIONS

International Search Report for International Application No. PCT/CN2014/082164 dated Apr. 15, 2015 (5 pages).

(Continued)

*Primary Examiner* — Angel R Estrada
(74) *Attorney, Agent, or Firm* — Merchant & Gould P.C.

(57) ABSTRACT

The invention relates to an adapter (101) used in a cable raceway (303), the adapter comprising: a main housing; at least one first connection part (103) disposed on the main housing for connecting the adapter (101) to the cable raceway (303); at least one second connection part (102) disposed on the main housing for connecting at least one distribution module (201) to the adapter (101); and at least one distribution modules (201) for connecting with cables in the adapter and introducing patch cords.

22 Claims, 10 Drawing Sheets

(58) Field of Classification Search
CPC ........ H02G 3/30; H02G 15/00; H02G 15/007;
H05K 5/00; H05K 5/02; H05K 5/0204
USPC ..... 174/480, 481, 50, 53, 57, 58, 68.1, 68.3,
174/72 A, 54; 220/3.2, 3.3, 3.5, 3.7,
220/4.02; 385/134, 135
See application file for complete search history.

(56) References Cited

U.S. PATENT DOCUMENTS

| | | | | |
|---|---|---|---|---|
| 5,942,724 | A * | 8/1999 | Russo | H02G 3/0431 174/481 |
| 6,284,975 | B1 * | 9/2001 | McCord | H02G 3/0608 174/481 |
| 6,342,675 | B1 * | 1/2002 | DeBartolo, Jr. | H02G 3/105 174/50 |
| 6,535,683 | B1 | 3/2003 | Johnson et al. | |
| 6,756,539 | B1 | 6/2004 | VanderVelde | |
| 6,925,242 | B2 | 8/2005 | Haataja et al. | |
| 7,592,543 | B2 * | 9/2009 | Caveney | H01R 9/2416 174/481 |
| 7,645,935 | B1 | 1/2010 | Picard, Jr. | |
| 7,893,362 | B2 * | 2/2011 | Feng | H01R 13/533 174/480 |
| 7,973,237 | B2 * | 7/2011 | Picard | H02G 3/14 174/50 |
| 9,312,670 | B1 * | 4/2016 | Baldwin | H02G 3/105 |
| 9,543,744 | B1 * | 1/2017 | Baldwin | H02G 3/088 |
| 2005/0041947 | A1 | 2/2005 | Barker et al. | |
| 2008/0017760 | A1 | 1/2008 | Larsen et al. | |
| 2010/0006317 | A1 | 1/2010 | Hruby et al. | |
| 2011/0074117 | A1 | 3/2011 | Caveney et al. | |
| 2011/0116758 | A1 | 5/2011 | Coburn et al. | |
| 2012/0295483 | A1 | 11/2012 | Smed | |

FOREIGN PATENT DOCUMENTS

| | | |
|---|---|---|
| CN | 201210694 Y | 3/2009 |
| CN | 201490644 U | 5/2010 |
| EP | 0 239 456 A1 | 9/1987 |
| EP | 2 672 592 A1 | 12/2013 |
| JP | 62-163505 A | 7/1987 |
| KR | 10-065330 B1 | 11/2006 |
| KR | 10-1396033 B1 | 5/2014 |
| WO | 2006076466 A2 | 7/2006 |

OTHER PUBLICATIONS

International Written Opinion for International Application No. PCT/CN2014/082164 dated Apr. 15, 2015 (3 pages).
Extended European Search Report for corresponding European Patent Application No. 14897519.6 dated Feb. 13, 2018, 7 pages.
Australian Examination Report, Application No. 2014401308, dated Oct. 31, 2018, 4 pages.
Chinese Office Action, Application No. 20140080578.0, dated Feb. 24, 2018, 8 pages.
European Examination Report dated Feb. 11, 2019 in reference to European Application No. 14 897 519.6-1201; 6 pages.

* cited by examiner

CABLE CHANNEL ADAPTER AND CABLE DISTRIBUTION SYSTEM

This application is a National Stage Application of PCT/CN2014/082164, filed 14 Jul. 2014 and which application is incorporated herein by reference. To the extent appropriate, a claim of priority is made to the above disclosed application.

TECHNICAL FIELD

The invention relates to an apparatus used in cabling for data communication in the telecommunication industry. In particular, the invention relates to an adapter used in a cable raceway and a cable distribution system comprising the adapter.

BACKGROUND

In the telecommunication industry, effective management and organization of cables and associate cable termination assemblies is necessary in light of the massive cabling schematics involved in providing telecommunication services. In current cabling and data centre, distribution modules are usually mounted in cable distribution frame on machine cabinet or frame and then are connected to a device or termination by means of patch cords introduced from the distribution modules.

However, in the case where the distribution modules are mounted in cable distribution frame on machine cabinet or frame, if distribution modules are to be applied, corresponding cable distribution frames must be mounted so that space in the machine cabinet or frame is occupied; if no cable distribution frame can be mounted due to no available space in machine cabinet or frame, it is difficult to expand channels for communication.

In order to improve the use for the space in the machine cabinet or frame, U.S. Pat. Nos. 7,463,812B2 and 7,899,299B2 each discloses an overhead cable termination arrangement, in which cables is introduced from the cable raceway to the cable termination via a cable termination arrangement having a curved cable exiting port disposed at one side of the cable raceway; and the cable termination is arranged unoccupied space located above the machine cabinet or frame.

Although the above U.S. patents has solved the problem of saving space in the machine cabinet or frame to a certain extent, the cable termination arrangements is complicated, can not be formed as an integral portion of the cable raceway, and are difficult to easily expand channels for communication.

SUMMARY OF THE INVENTION

In order to solve the above problems existing in the prior art, the invention provides an adapter used in a cable raceway and a cable distribution system comprising the adapter.

An aim of the invention is to provide an adapter for easily saving space in the machine cabinet or frame.

Another aim of the invention is to provide an adapter for easily expanding channels for communication.

A further aim of the invention is to provide an adapter having multiple connection functions.

A still further aim of the invention is to provide an adapter acted as a connection means for connecting two sections of cable raceway.

The above aims of the invention can be achieved by the following technical solution.

The invention provides an adapter used in a cable raceway, the adapter comprising: a main housing comprising a flat bottom wall and a plurality of sidewalls vertically extending from the bottom wall; at least one first connection part disposed on at least one sidewall for connecting the adapter to the cable raceway by a corresponding coupling member; at least one second connection part disposed on corresponding sidewalls for connecting at least one distribution module to the adapter; and at least one distribution modules for connecting with cables in the adapter and introducing patch cords.

The invention further provides a cable distribution system comprising an adapter according to the invention, wherein the adapter is connected with a cable raceway through a coupling member.

Since the distribution modules are directly mounted in the adapter in the cable raceway, patch cords can be introduced from the distribution modules to be directly connected to the device and termination, thereby saving space in the machine cabinet or frame and reducing costs.

If there is no available space in machine cabinet or frame, a plurality of distribution modules can be mounted in the adapter to easily expand channels for communication.

Further, the adapter can be used as a connection means for connecting two sections of cable raceway, and thereby forming a part of the cable raceway.

Furthermore, a first connection part, a second connection part or a third connection part can be formed in the fourth sidewall of the adapter so that the adapted can have multiple connection applications, for example a connection with another section of cable raceway, a connection with another distribution module or a connection with a end cap.

Moreover, the adapter can be used in overhead cable raceway and can also be used in floor cable raceway.

BRIEF DESCRIPTION OF THE FIGURES

The embodiments of the present invention will be described only by way of non-limiting example referring to the accompanying figures in which.

DETAILED EMBODIMENTS

Reference will now be made to the accompanying figures in detail to illustrate embodiments of the invention. Wherever possible, the same reference signs will be used throughout the figures to indicate the same or like parts.

Figure 1:
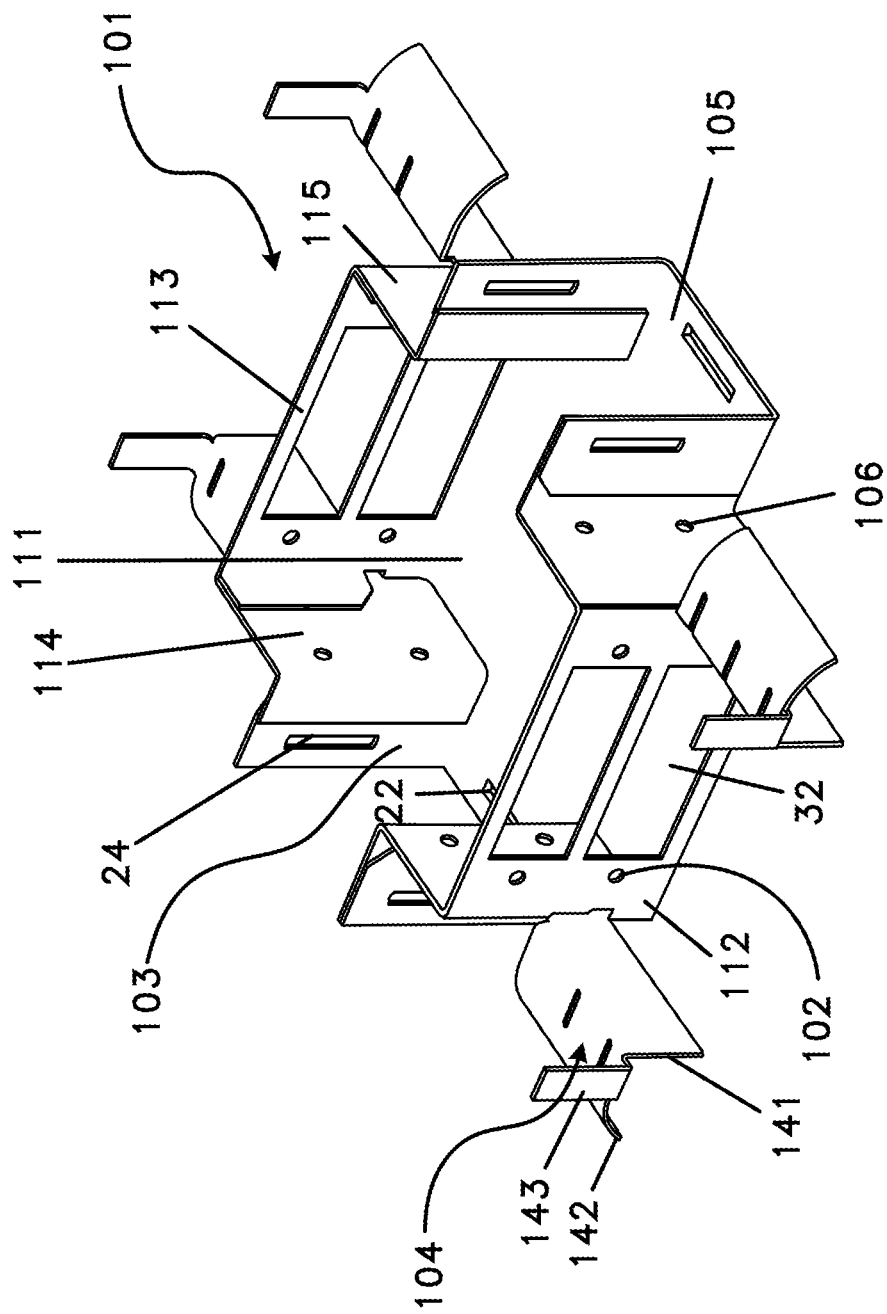
FIG. 1 shows a perspective view of an adapter according to an embodiment of the invention.

Initially referring to FIG. 1, FIG. 1 shows an adapter 101 used in a cable raceway 303 according to the invention. The adapter comprises: a main housing comprising a flat bottom wall and four sidewalls vertically extending from the bottom wall, a first connection part disposed on at least one sidewall for connecting the adapter to the cable raceway, a second connection part disposed on another sidewalls for connecting a distribution module to the adapter, a distribution module for connecting with cables in the adapter and introducing patch cords, and a cable management bracket disposed on the another sidewalls for managing the patch cords introduced from the distribution module.

As shown in FIG. 1, the main housing comprises a flat bottom wall 111 and four sidewalls vertically extending from the bottom wall, namely, a first sidewall 112 and an opposing second sidewall 113, and a third sidewall 114 and an opposing fourth sidewall 115. The third sidewall 114 and the fourth sidewall 115 each includes a main wall portion being vertical with respect to the first sidewall 112 and the second sidewall 113 and an extension wall portion extending from the main wall portion. The bottom wall 111 includes bottom wall extension portions outwardly extending at two sides. The bottom wall extension portions are respectively vertically crossed with the extension wall portions of the third sidewall 114 and the fourth sidewall to form a U-shaped configuration mating with the U-shaped cross section of the cable raceway 303.

As shown in FIG. 1, the first connection part 103 can be disposed on the third side wall for connecting the adapter 101 to the cable raceway 103. The first connection part 103 may comprise a bottom wall extension portion and the extension wall portion of the third side wall. Preferably, the first connection part 103 further includes an elongated mounting slot 22 in the bottom wall extension portion and elongated mounting slots 24 in the extension wall portion of the third side wall.

As shown in FIG. 1, the second connection part 102 can be disposed on the first side wall 112, the second side wall 113 and/or the fourth side wall 115, for connecting a distribution module 201 to the adapter 101. The second connection part 102 can be in a form of a plurality of mounting holes. Preferably, the second connection part 102 may include four mounting holes.

Figure 2:
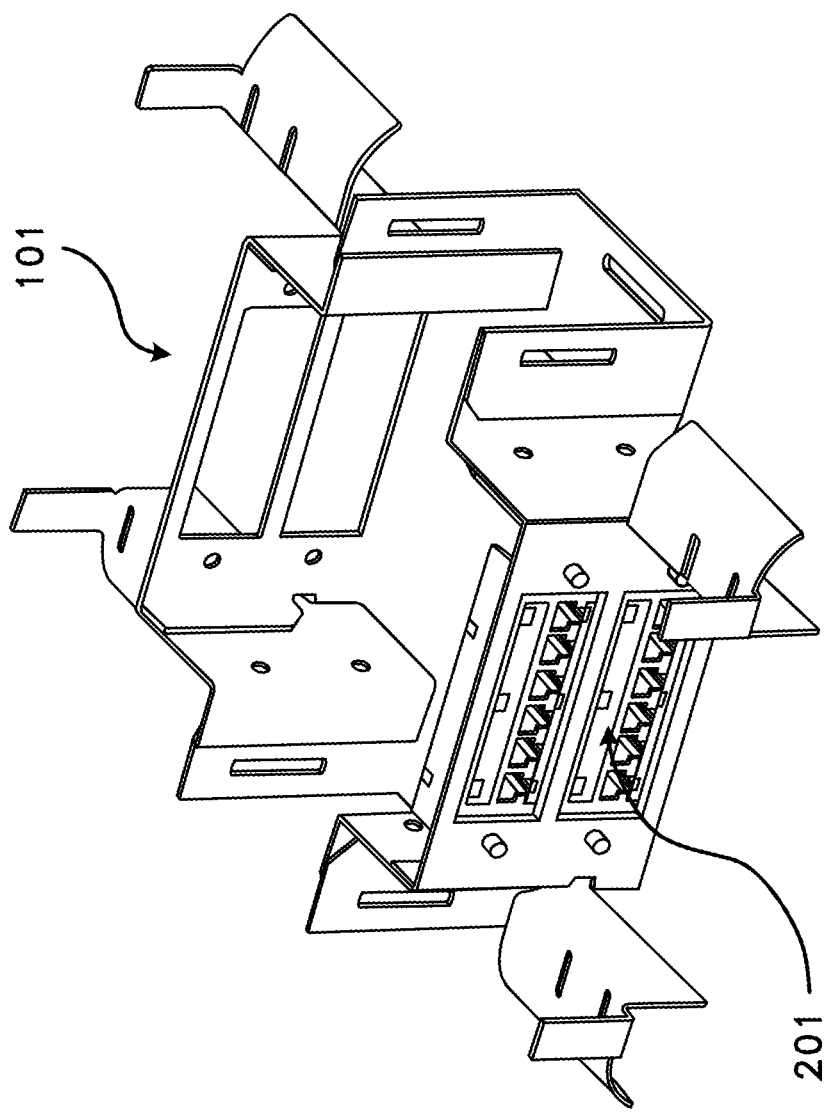
FIG. 2 shows a perspective view of an adapter according to the invention fitted with a distribution module.

The distribution module 201 may be a distribution module commonly used in the art. As shown in FIG. 2, the distribution module 201 is inserted into the adapter from inner side of the first side wall, and then is removably connected by inserting four screw connectors, snap fasteners or the likes into four mounting holes of the second connection part 102 and corresponding holes in the distribution module 201. The distribution module 201 is connected with the cables in the adapter at its inner side and introduces patch cords at its outer side. The first side 112 is further provided with a window 32 for exposing a portion of the distribution module 201 for introducing the patch cords, thereby facilitating the introduction of the patch cords. The third side wall 113 may be also provided with the same mounting holes and window and may be fitted with the same distribution module 201.

Figure 7:
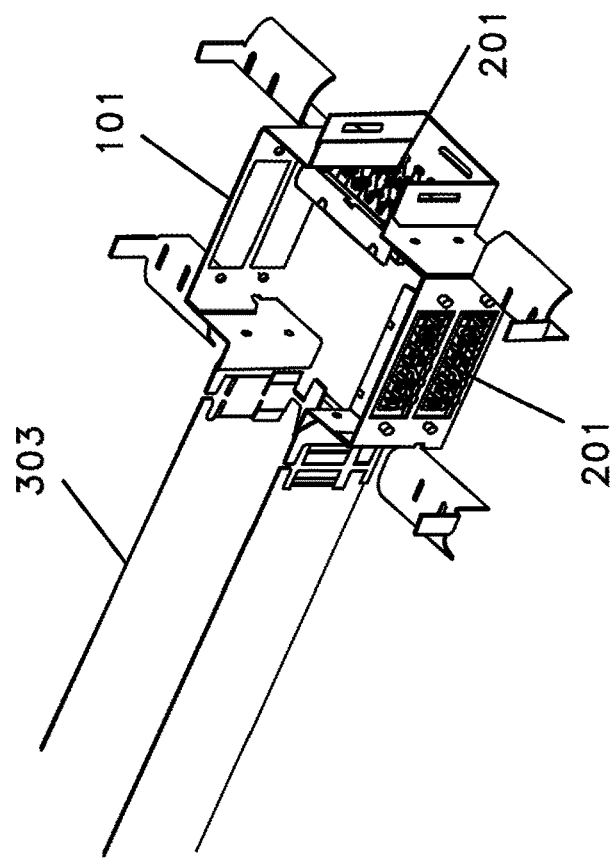
FIG. 7 shows an assembled perspective view of the adapter according to the invention fitted with another distribution module.
Figure 6:
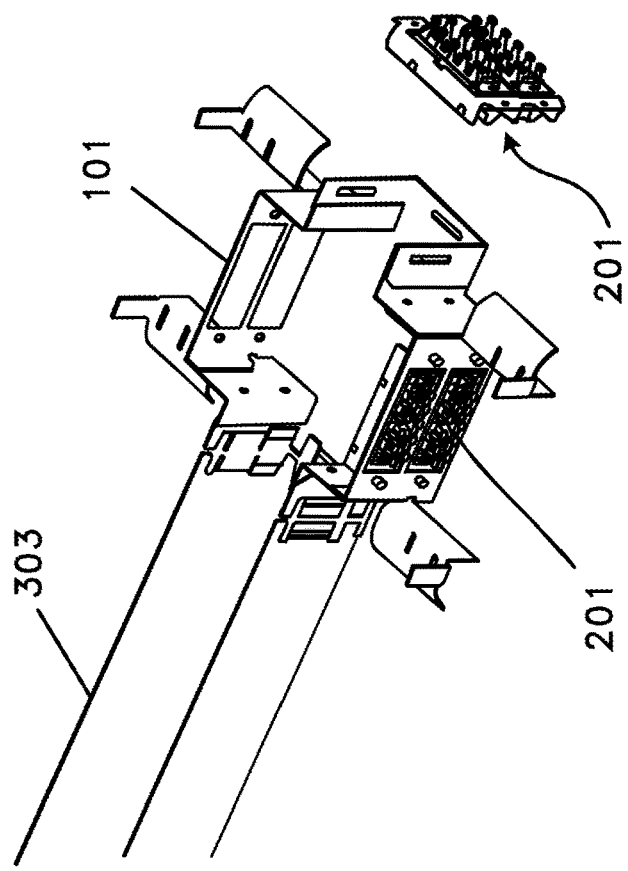
FIG. 6 shows an explosive perspective view of the adapter according to the invention fitted with another distribution module.

As shown in FIG. 6, the main wall portion of the fourth sidewall 115 may be also provided with four mounting holes and may be fitted with the same distribution module 201 (see FIG. 7). Since a channel is formed between the extension wall portions of the fourth side wall, the portion of the fitted distribution module 201 for introducing the patch cords can be exposed, thereby facilitating the introduction of the patch cords.

In the way, cables in the cable raceway 303 may be directly connected to one distribution module 201 within the adapter 101, and then patch cords introduced from the distribution module 201 are connected to the device or termination, thereby saving space in the machine cabinet and frame and reducing costs. Further, since there are a plurality of the distribution modules (at least two, preferable three) 201 directly mounted in the adapter, it is easy to expand the channels for communication.

Generally, the distribution modules 201 may be copper modules or optical fiber modules mounted in the adapter 101.

Still referring to FIG. 1, the cable management brackets 104 may be disposed on at least one end of the first side wall 112 and/or the second side wall 113 for managing the patch cords introduced from the distribution module. Preferably, the cable management brackets 104 are respectively disposed on two ends of the first side wall 112 and the second side wall 113. That is, there are four cable management brackets 104. Each cable management bracket 104 may comprise a straight portion 141 and a curved portion 142 outwardly extending from the straight portion. The cable management bracket 104 can be welded to the end of the corresponding side wall at one end of the straight portion. Further, the cable management bracket 104 can be connected to the end of the corresponding side wall by screw connector. Other possible connection means can also be used. The curved portion 142 is adapted to direct the patch cords and the radius of the curved portion is able to prevent excess curve of the patch cords.

As shown in FIG. 1, it is preferred that the cable management bracket 104 may further comprise a finger portion 143 vertically and upwardly extending from an outward end of the curved portion. The finger portion 143 can help to prevent slippage of the patch cords from the curved portion.

As shown in FIG. 1, it is preferred that the curved portion 142 may be further provided with a plurality of connection slots through which a binding tape passes for binding the patch cords together, thereby facilitating management of the patch cords and preventing slippage of the patch cords from the curved portion.

Figure 5:
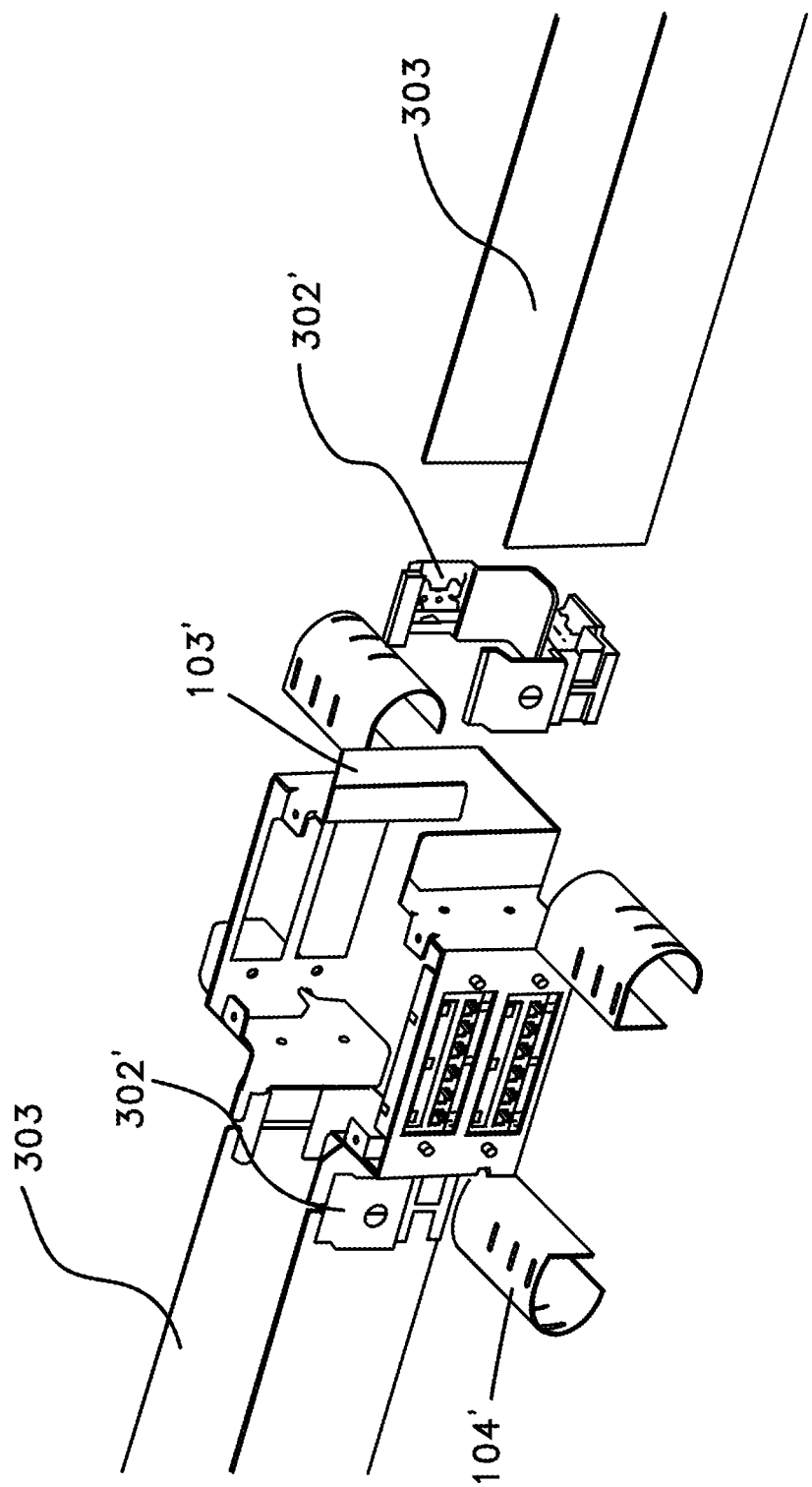
FIG. 5 shows an explosive perspective view of the adapter according to the invention connected with the cable raceway by an alternative coupling member.

FIG. 5 shows an alternative cable management bracket 104'. The curved portion 142 is provided with multiple rows of connection slots. A binding tape can pass through suitable connection slots for binding the patch cords together. Preferably, there are two rows with at least two connection slots in each row. In the way, a user can select suitable connection slots as required.

Of course, the finger portion and/or the connection slots may be provided.

Figure 3:
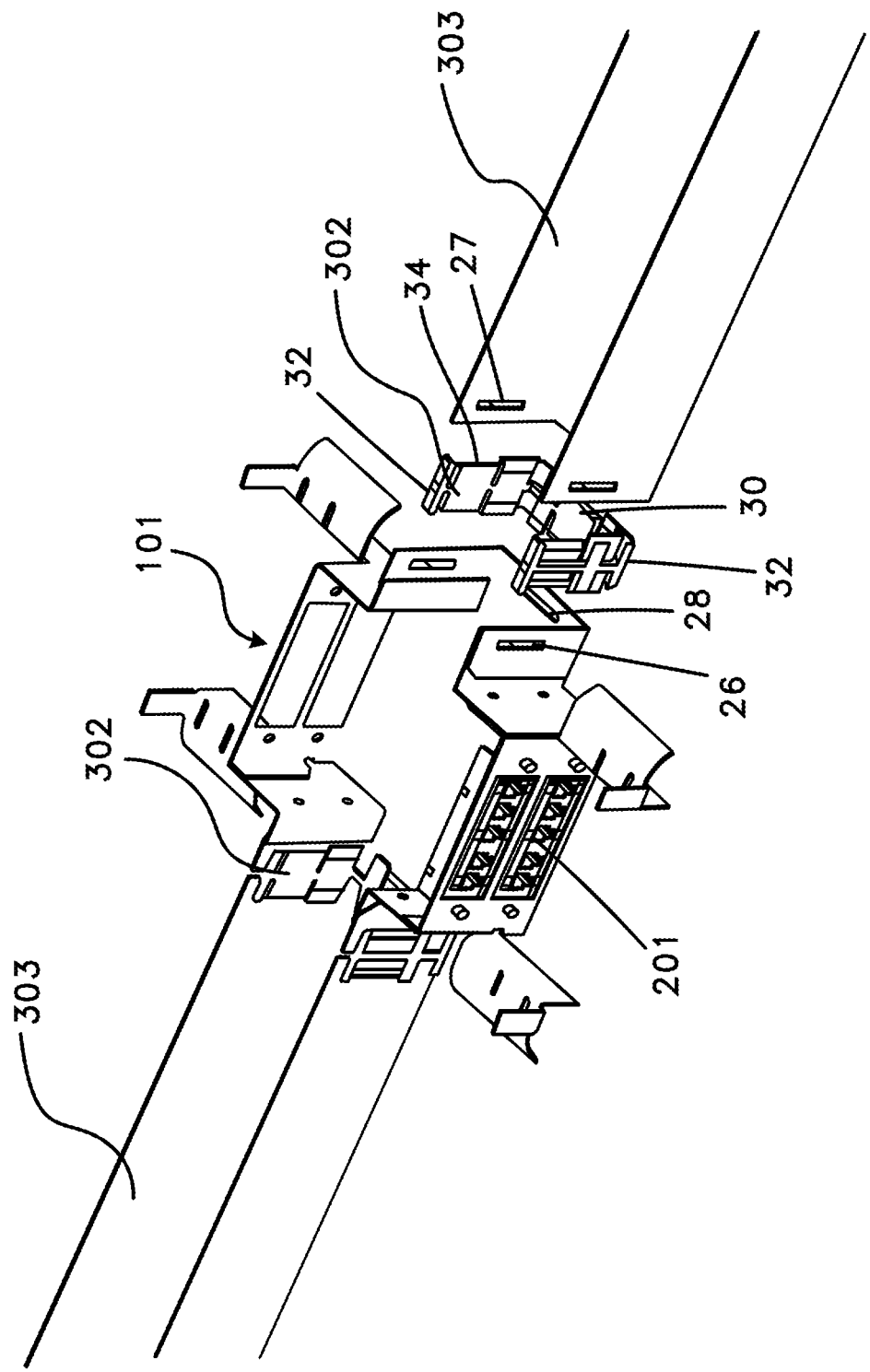
FIG. 3 shows an explosive perspective view of the adapter as shown in FIG. 2 connected with the cable raceway by a coupling member.
Figure 4:
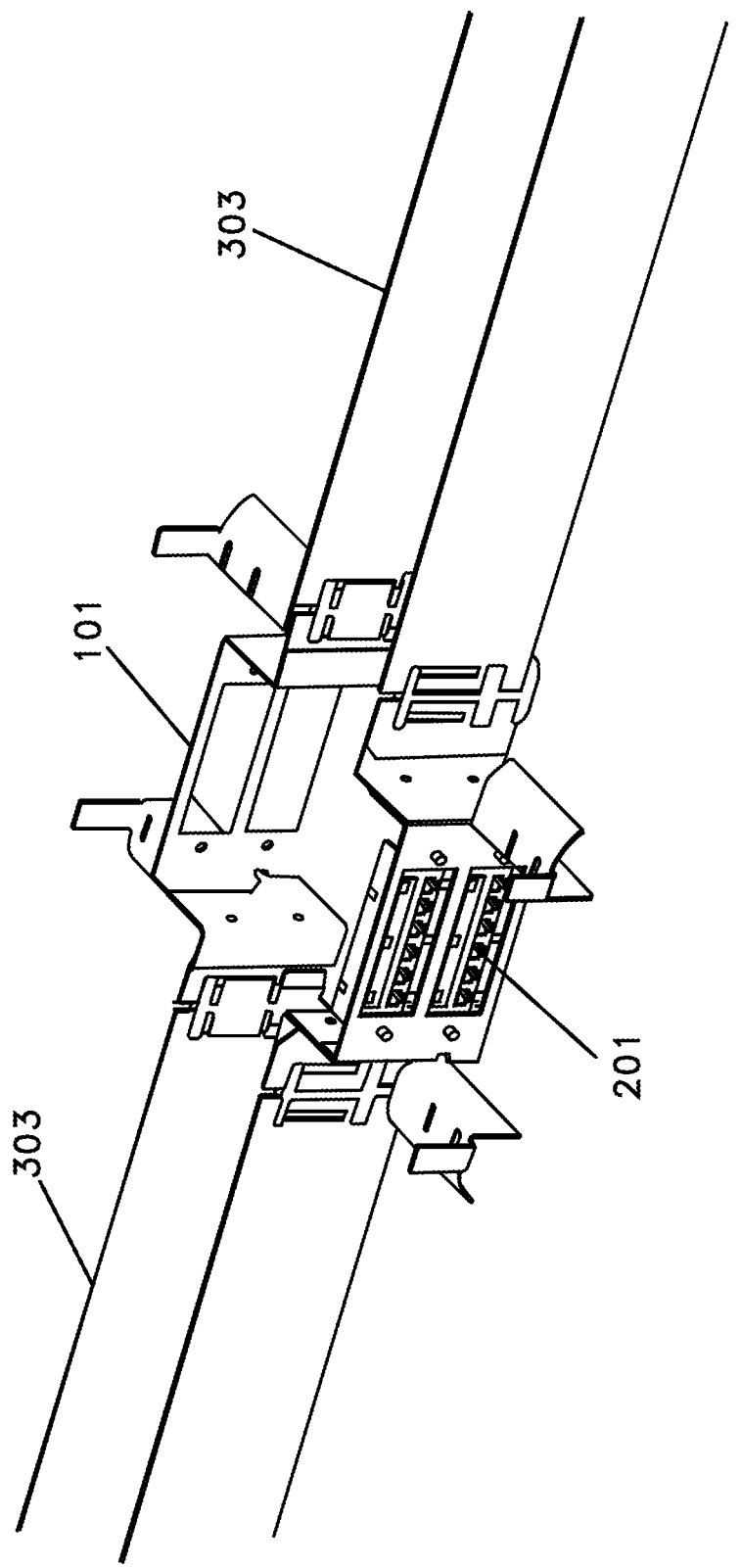
FIG. 4 shows an assembled perspective view of the adapter as shown in FIG. 2 connected with the cable raceway by the coupling member.

As shown in FIG. 3, the first connection part can be disposed on the extension wall portion of the fourth side wall 115. The first connection part may comprise the extension wall portion of the fourth side wall 115 and the bottom wall extension portion which form the U-shaped configuration, and may also comprise elongated mounting slots 26, 28 therein. The cable raceway 303 may comprise corresponding elongated mounting slots 27 at its connection end. The first connection part may be connected with the cable raceway by a coupling member 302 so that the adapter 101 at its two ends can be connected with two sections of cable raceway 303 to form a single piece, as shown in FIG. 4.

As shown in FIG. 3, the coupling member 302 is in a form of U-shape which mates with the U-shaped cross section of the cable raceway 303. The coupling member 302 comprises a base and two legs. The coupling member 302 further comprises: a clamping portion 32 extending towards two sides from a top end and a bottom end of each leg of the coupling member to be adapted to clamp the extension wall portion of the side wall and the sidewall of the cable raceway; a first resilient inclined portion 34 extending towards two sides between the top end and the bottom end to be inserted into the elongated mounting slots in the extension wall portion of the side wall and the sidewall of the cable raceway; a second resilient inclined portion 36 extending towards two sides at middle of the base to be inserted into the elongated mounting slots in the bottom wall extension portion and the bottom wall of the cable raceway. The adapter 101 and the cable raceway 303 can be connected together by clamping the extension wall portion of the corresponding side wall and the side wall of the cable raceway with the clamping portions and by inserting the first and second resilient inclined portions into the corresponding elongated mounting holes. In other words, the adapter 102 can be formed as a part of the cable raceway 303. Further, the adapter 101 can be used as a connection means for connecting two sections of cable raceway 303.

FIG. 5 shows an alternative coupling member 302' and an alternative first connection 103'. In this embodiment, the coupling member 302 is in a form of U-shape which mates with the U-shaped cross section of the cable raceway 303. The coupling member 302' also comprises a base and two legs with a curved resilient snap portion at top end thereof. The first connection part 103' and the cable raceway 303' do not comprise the elongated mounting slots but only comprise the extension wall portion of the corresponding side wall and the bottom wall extension portion which form the U-shaped configuration. The adapter and the cable raceway can be connected together by inserting the U-shaped configuration of the adapter and the connection end of the cable raceway into the coupling member 302' and by snapping the extension wall portion of the corresponding side wall and the side wall of the cable raceway from the top by the curved resilient snap portion.

Other possible connection means can be adopted which can connect the first connection part and the cable raceway together so as to connect the adapter into the cable raceway for forming a single piece.

Optionally, the first connection part may be integrally formed with the coupling member. For example, the first connection is configured to be in a form of half of the coupling member as shown in FIG. 3 for directly connecting with the cable raceway.

As shown in FIG. 6, the second connection part 102 can also be disposed on the main wall portion of the fourth side wall 115 so that the distribution module 201 can be fitted into the adapter as shown in FIG. 2. FIG. 7 further shows an assembled perspective view of the adapter fitted with two distribution modules.

Figure 8:
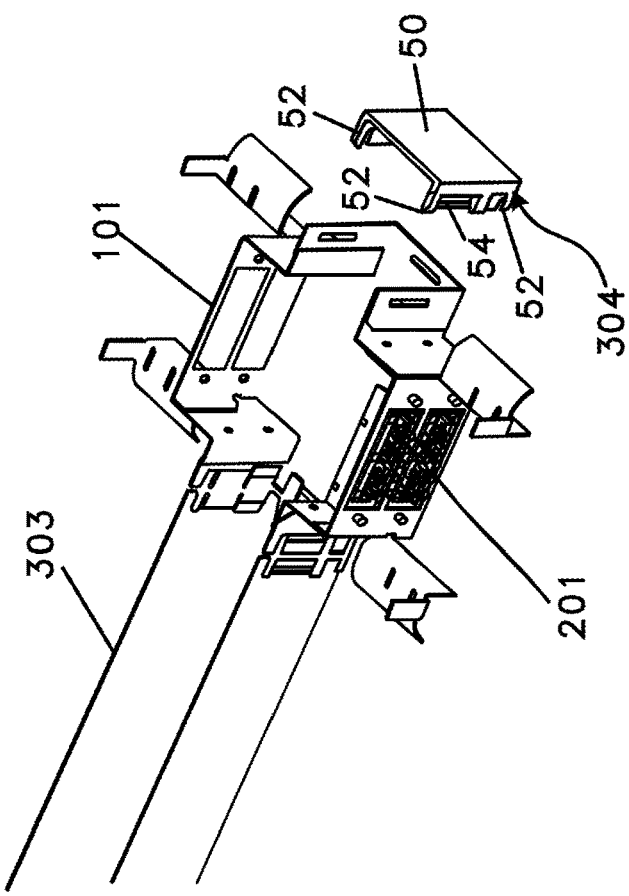
FIG. 8 shows an explosive perspective view of the adapter according to the invention fitted with an end cap.

As shown in FIG. 8, a third connection part can be disposed on the extension wall portion of the fourth side wall 115 for connecting an end cap 304 to the adapter 101. In the case where there is no need to connect the adapter with another section of cable raceway, the present embodiment can be adopted.

Figure 9:
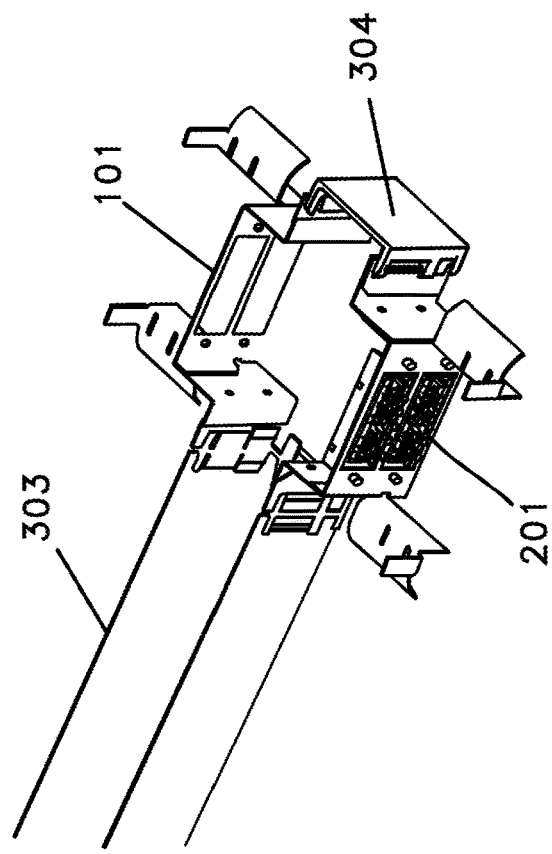
FIG. 9 shows an assembled perspective view of the adapter according to the invention fitted with an end cap.

The third connection part may be same as the structure of the first connection part 103 as shown in FIG. 3. The structure of the end cap 304 may be same as a half part of the coupling member 302 as shown in FIG. 3, except for a closed end wall. In particular, the end cap 304 comprises a base, two legs and a closed end wall. A clamping portion 52 extends towards one side from a top end and a bottom end of each leg to be adapted to clamp the extension wall portion of the fourth side wall. A first resilient inclined portion 54 extends towards one side between the top end and the bottom end to be inserted into the elongated mounting slots in the extension wall portion of the fourth side wall. A second resilient inclined portion 36 is disposed on the base and extends towards one side at middle of the base to be inserted into the elongated mounting slots in the bottom wall extension portion. In this way, the adapter 101 and the end cap 304 can be connected together by clamping the extension wall portion of the fourth side wall with the clamping portions and by inserting the first and second resilient inclined portions into the corresponding elongated mounting holes. FIG. 9 further shows an assembled perspective view of the adapter fitted with the end cap 304.

The third connection part may be same as the structure of the first connection part 103' as shown in FIG. 5. The structure of the end cap 304 may be same as a half part of the coupling member 302' as shown in FIG. 5, except for a closed end wall. In particular, the end cap 304 comprises a base, a closed end wall and two legs with a curved resilient snap portion at top end of each leg. The third connection part do not comprise the elongated mounting slots but only comprise the extension wall portion of the fourth side wall and the bottom wall extension portion which form the U-shaped configuration. The adapter and the end cap 304 can be connected together by inserting the U-shaped configuration of the adapter into the end cap and by snapping the extension wall portion of the fourth side wall from the top by the curved resilient snap portion.

Since a first connection part, a second connection part or a third connection part can be formed in the fourth sidewall of the adapter so that the adapted can have multiple connection applications, for example a connection with another section of cable raceway (see FIGS. 3-5), a connection with another distribution module (see FIGS. 6 and 7), or a connection with a end cap (see FIGS. 8 and 9).

Figure 11:
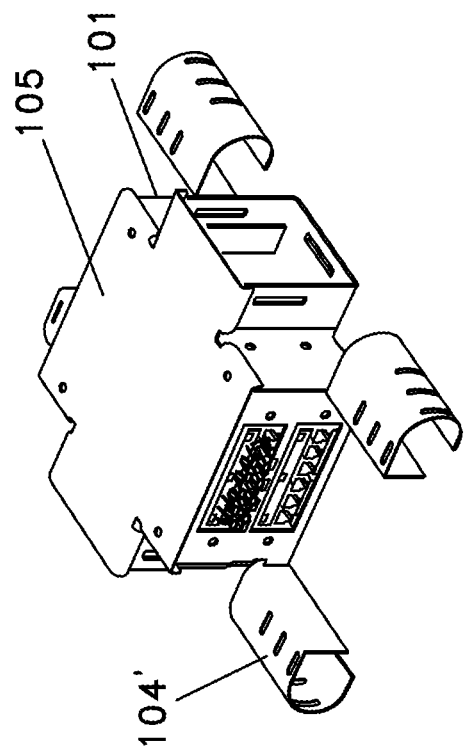
FIG. 11 shows an assembled perspective view of the adapter according to the invention fitted with a top cover.
Figure 10:
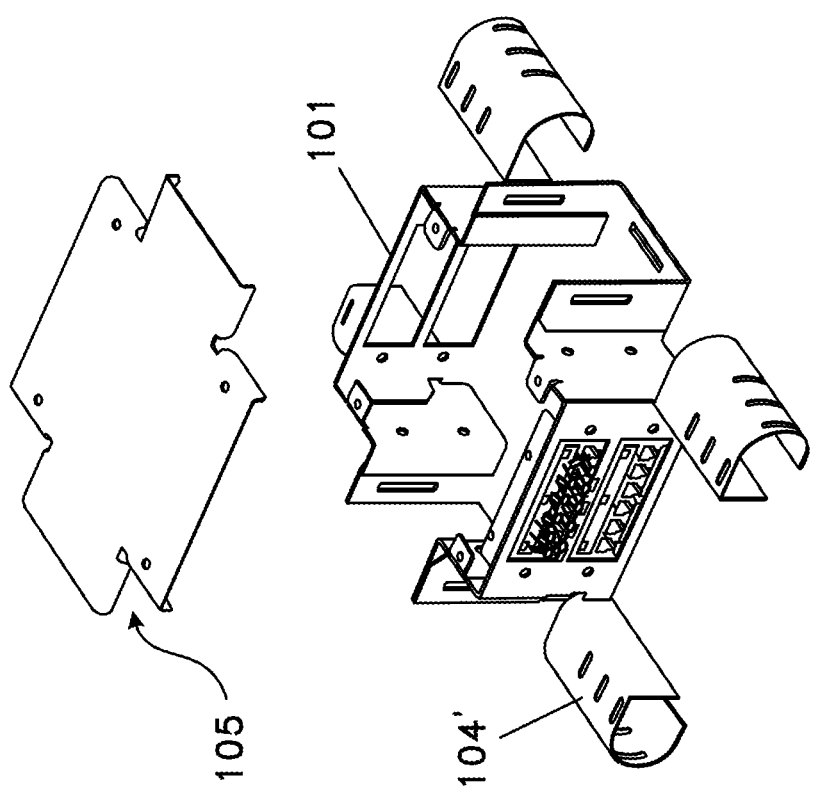
FIG. 10 shows an explosive perspective view of the adapter according to the invention fitted with a top cover.

As shown in FIGS. 10-11, the adapter according to the present invention can be fitted with a top cover 105 to prevent impurity from entering the adapter and to protect the components in the adapter.

Figure 12:
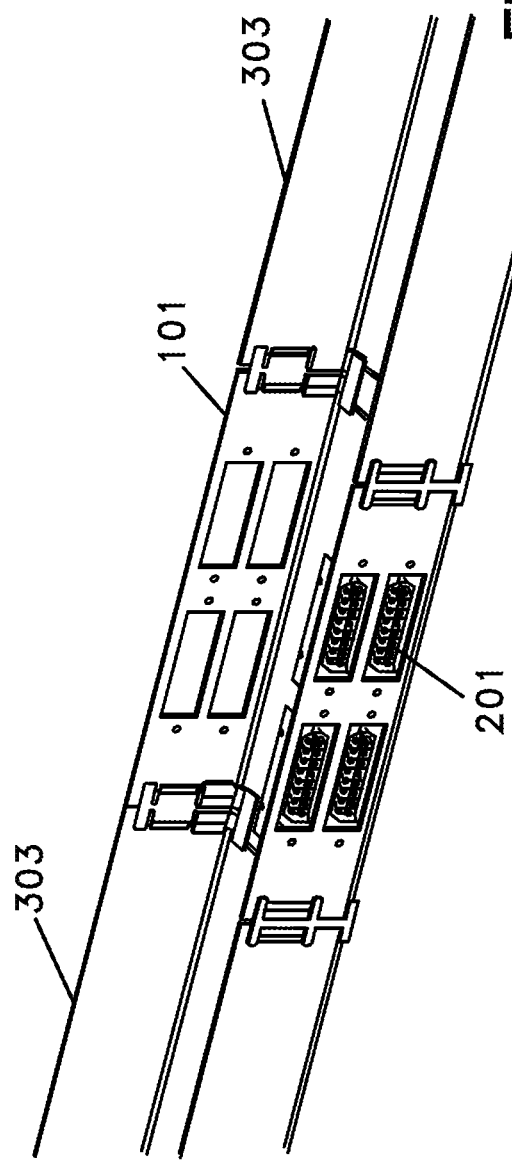
FIG. 12 shows an assembled perspective view of the adapter according to another embodiment of the invention connected with the cable raceway.
Figure 13:
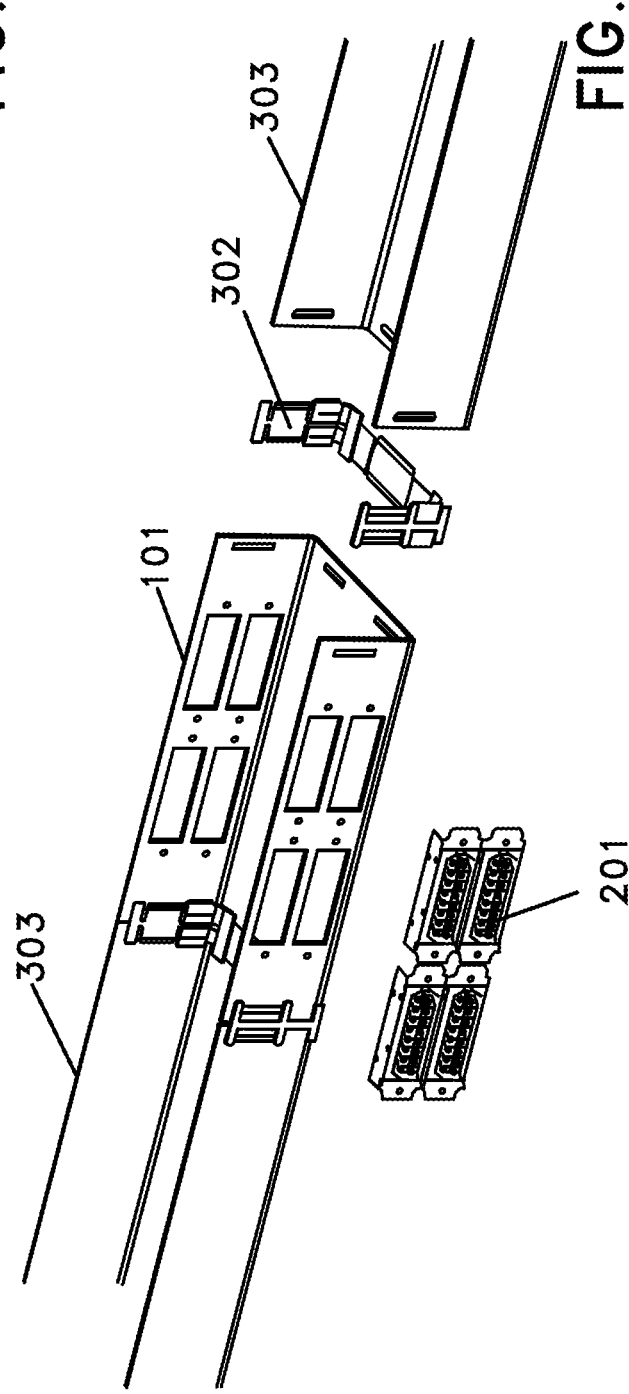
FIG. 13 shows an explosive perspective view of the adapter according to another embodiment of the invention connected with the cable raceway.

FIGS. 12 and 13 respectively shows an explosive view and an assembled perspective view of the adapter according to another embodiment of the invention connected with the cable raceway. As shown in FIG. 13, the housing of the adapter comprises a first sidewall and an opposing second sidewall, which together with the bottom side, form two U-shaped configurations corresponding to U-shaped cross-section of the cable raceway. The first sidewall and the second sidewall each is provided with at least one window for exposing a part of the distribution module. The at least one window may be two or four or more windows.

As shown in FIG. 13, the first connection part of the adapter may comprise the U-shaped configuration and elongated mounting slots therein, for connecting to the cable raceway by the coupling member 302 as shown in FIG. 3.

The first connection part of the adapter may only comprise the U-shaped configuration for connecting to the cable raceway by the coupling member 302' as shown in FIG. 5.

In the embodiment as shown in FIG. 13, the adapter comprises one first connection part at two ends of the first and second side walls. On each of the first and second side walls, is provided with two second connection parts for connecting with the distribution modules.

Figure 15:
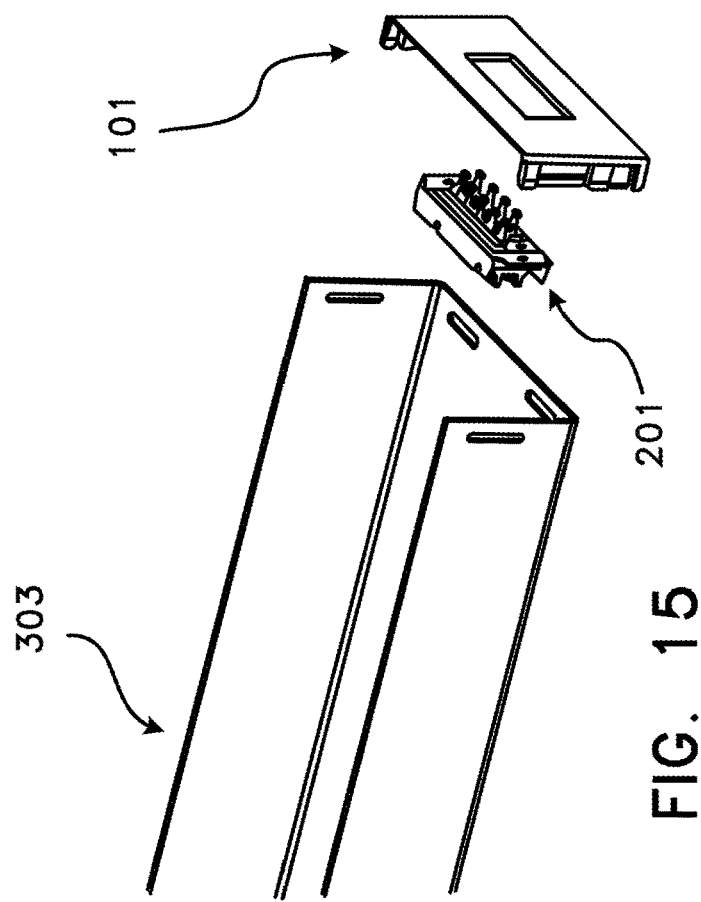
FIGS. 14 and 15 respectively show an assembled and an explosive perspective views of the adapter according to still another embodiment of the invention connected with the cable raceway.
Figure 14:
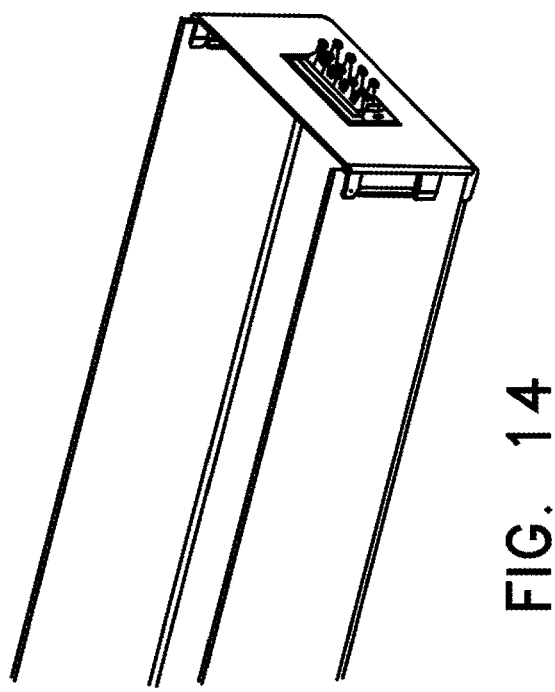

FIGS. 14 and 15 respectively show an assembled and an explosive perspective view of the adapter according to still another embodiment of the invention connected with the cable raceway. As shown in FIG. 15, the housing is similar to the end cap as shown in FIG. 8, except that the closed wall of the end is provided with at least one second connection part for mounting at least one distribution module and at least one window for exposing a part of the distribution module. Moreover, the legs of the end cap are used as at least one first connection part for connecting with the cable raceway.

It is also within the scope of the invention that the adapter may have other configurations, as long as it can be directly connected to the cable raceway or be connected to the cable raceway by a corresponding coupling member to be formed as a part of the cable raceway.

In the case where the adapter does not need to be connected to another section of the cable raceway, one of the U-shaped configuration can form as a third connection part for connecting a end cap to the adapter 101. The end cap may be a half part of the coupling member 302 as shown in FIG. 3 or a half part of the coupling member 302' as shown in FIG. 5, except for a closed end wall.

It is also within the scope of the invention that the housing of the adapter may have other polygon structure, as long as it may provide at least one first connection part for connecting with the cable raceway and at least one second connection part for connecting with at least one distribution module.

The invention further provides a cable distribution system comprising an adapter according to the invention, wherein the adapter can be connected with a cable raceway. Compared with conventional cable distribution system, the cable distribution system according to the invention can not only save space in the machine cabinet or frame but also easily expand channels for communication.

While preferred embodiments of the invention have been described as above with reference to the accompanying figures, the present invention is not limited to the above embodiments as described and illustrated, but may be varied in various ways within the scope of the appended claims.

The invention claimed is:

1. An adapter used in a cable raceway having a transverse cross-section, the adapter comprising:
   a main housing extending along a length between a first end and a second end and extending between a first side and a second side, the main housing including a bottom wall extending along the length, the main housing also including a first sidewall extending upwardly from the bottom wall at the first side and a second sidewall extending upwardly from the bottom wall at the second side so that the main housing defines an open interior, the first end of the main housing being configured to mount to a respective section of the cable raceway so that the first end is in-line with a channel of the cable raceway, the main housing also having a width that extends beyond the transverse cross-section of the cable raceway, the bottom wall extending along the width, the width being defined between the first and second sidewalls, the first sidewall defining a window;
   at least one first connection part disposed at the first end of the main housing for connecting the adapter to the cable raceway; and
   at least one distribution module disposed within the main housing and mounted at the first sidewall, the distribution module having an inner side and an outer side, the inner side facing the second sidewall and the outer side being accessible from an exterior of the main housing through the window, the outer side defining a port for receiving a patch cord.

2. The adapter according to claim 1, wherein the bottom wall is flat and wherein the sidewalls vertically extend from the bottom wall.

3. The adapter according to claim 1, wherein the adapter further comprises at least one cable management bracket disposed at the first sidewall for managing any patch cords received at the distribution module.

4. The adapter according to claim 2, wherein the first sidewall and the second sidewall each is provided with at least one window at which the distribution module can be received.

5. The adapter according to claim 1, further comprising an end cap mounted to the second end of the main housing of the adapter.

6. The adapter according to claim 1, wherein another section of the cable raceway mounts to the second end of the main housing so that the adapter is disposed at an intermediate location along the cable raceway.

7. The adapter according to claim 1, wherein the first sidewall defines multiple windows each sized to receive a distribution module.

8. The adapter according to claim 1, wherein the first sidewall defines a plurality of mounting holes that aid in mounting the distribution module to the adapter.

9. The adapter according to claim 3, wherein each cable management bracket comprises a straight portion and a curved portion outwardly extending from the straight portion.

10. The adapter according to claim 9, wherein each cable management bracket further comprises a finger portion vertically and upwardly extending from an outward end of the curved portion.

11. The adapter according to claim 9, wherein the curved portion is provided with a plurality of connection slots through which a binding tape passes for binding the patch cords together.

12. The adapter according to claim 1, wherein the adapter is further provided with a top cover.

13. The adapter according to claim 1, wherein the first connection part connects the adapter to the cable raceway by a coupling member.

14. The adapter according to claim 13, wherein the coupling member is integrally formed with the first connection part.

15. The adapter according to claim 13, wherein the coupling member comprises a base and two legs with a curved resilient snap portion at a top end of each leg.

16. The adapter according to claim 1, wherein each of the first and second ends of the main housing has a transverse cross-section that generally matches the transverse cross-section of the cable raceway.

17. A cable raceway system comprising:
a first cable raceway section defining a cable passage accessible through an open top of the first cable raceway section; and
an adapter mounted to the first cable raceway section, the adapter extending along a length between first and second ends that are in-line with the cable passage, the adapter including a bottom wall that continues the cable passage between the first and second ends, the adapter also extending along a width between first and second sidewalls extending upwardly from the bottom wall and along the cable passage, the width being transverse to the length, the adapter defining an open top opposite the bottom wall, the open top being continuous with the open top of the first cable raceway, at least the first sidewall defining an aperture sized to receive a distribution module, the adapter being shaped to define an expanded region disposed between the continued cable passage and the first sidewall, the bottom wall extending across the expanded region.

18. The cable raceway system of claim 17, further comprising a second cable raceway section; wherein the first end of the adapter mounts to the first cable raceway section and the second end of the adapter mounts to the second cable raceway section.

19. The cable raceway system of claim 17, further comprising an end cap that mounts to the second end of the adapter.

20. The cable raceway system of claim 19, wherein the end cap is configured to hold a distribution module.

21. An adapter used in a cable raceway having a transverse cross-section, the adapter comprising:
a main housing extending along a length between a first end and a second end, the first end being configured to mount to a respective section of the cable raceway so that the main housing can be coupled to the cable raceway with the first end being in-line with the cable raceway, the main housing also having a width that extends beyond the transverse cross-section of the cable raceway, the width being defined between opposing sidewalls, the main housing defining an open interior that extends between the opposing sidewalls;
at least one first connection part disposed at the first end of the main housing for connecting the adapter to the cable raceway;
at least one second connection part disposed at a first of the opposing sidewalls; and
at least one distribution modules mounted at the second connection part, the distribution module having an inner side and an outer side, the inner side facing a second of the opposing sidewalls and the outer side being accessible from an exterior of the main housing, the outer side defining a port for receiving a patch cord;
wherein the adapter further comprises at least one cable management bracket disposed at the first sidewall for managing any patch cords received at the distribution module, wherein each cable management bracket comprises a straight portion and a curved portion outwardly extending from the straight portion.

22. An adapter used in a cable raceway having a transverse cross-section, the adapter comprising:
a main housing extending along a length between a first end and a second end, the first end being configured to mount to a respective section of the cable raceway so that the main housing can be coupled to the cable raceway with the first end being in-line with the cable raceway, the main housing also having a width that extends beyond the transverse cross-section of the cable raceway, the width being defined between opposing sidewalls, the main housing defining an open interior that extends between the opposing sidewalls;
at least one first connection part disposed at the first end of the main housing for connecting the adapter to the cable raceway, wherein the first connection part connects the adapter to the cable raceway by a coupling member, wherein the coupling member comprises a base and two legs with a curved resilient snap portion at a top end of each leg;
at least one second connection part disposed at a first of the opposing sidewalls; and
at least one distribution module mounted at the second connection part, the distribution module having an inner side and an outer side, the inner side facing a second of the opposing sidewalls and the outer side being accessible from an exterior of the main housing, the outer side defining a port for receiving a patch cord.

* * * * *